United States Patent [19]

Mueller

[11] Patent Number: 5,358,124
[45] Date of Patent: Oct. 25, 1994

[54] STORAGE RACK

[76] Inventor: Frank Mueller, Kriemhildenstrasse 10, 76185 Karlsruhe, Fed. Rep. of Germany

[21] Appl. No.: 111,290

[22] Filed: Aug. 24, 1993

[30] Foreign Application Priority Data

Feb. 9, 1993 [DE] Fed. Rep. of Germany ....... 4303698

[51] Int. Cl.$^5$ .............................................. A47G 19/08
[52] U.S. Cl. ........................................ 211/41; 211/40
[58] Field of Search ................... 211/40, 41; 206/454; 188/500

[56] References Cited

U.S. PATENT DOCUMENTS

| 415,634 | 11/1889 | Guptill | 211/41 |
|---|---|---|---|
| 2,825,465 | 3/1958 | Burgo | 211/40 |
| 3,173,546 | 3/1965 | Vershbow | 211/41 |
| 3,682,083 | 8/1972 | Puente | 211/41 X |
| 4,241,955 | 12/1980 | Armisteao | 211/40 X |
| 4,872,554 | 10/1989 | Quernemoen | 211/41 X |
| 5,033,406 | 7/1991 | Lee | 211/41 X |
| 5,117,984 | 6/1992 | Kennedy | 211/41 |
| 5,145,074 | 9/1992 | Miley | 211/41 |
| 5,188,240 | 2/1993 | Marino et al. | 211/41 |
| 5,195,642 | 3/1993 | Daroashti | 211/40 X |

FOREIGN PATENT DOCUMENTS

| 465809A2 | 1/1992 | European Pat. Off. . | |
| 732697 | 3/1943 | Fed. Rep. of Germany . | |
| 8910971 | 12/1989 | Fed. Rep. of Germany . | |
| 9102999.6 | 8/1991 | Fed. Rep. of Germany . | |
| 9103216.4 | 8/1991 | Fed. Rep. of Germany . | |
| 9107752 | 8/1991 | Fed. Rep. of Germany . | |
| 9106686.7 | 9/1991 | Fed. Rep. of Germany . | |
| 9200776.7 | 6/1992 | Fed. Rep. of Germany . | |
| 9204421.2 | 7/1992 | Fed. Rep. of Germany . | |
| 9216740.3 | 5/1993 | Fed. Rep. of Germany . | |
| 1181017 | 6/1959 | France | 211/40 |
| 200695 | 11/1954 | United Kingdom | 211/41 |

Primary Examiner—Blair M. Johnson
Attorney, Agent, or Firm—Quarles & Brady

[57] ABSTRACT

A rack for the storage of CD cases or other rectilinear objects preferably has a support providing two lateral wall components that hold or support the CD cases at least in the area of one of their diagonal ends by means of opposite, lateral contacts, whereby the lateral wall components that face the CD cases are arranged at an angle of greater than 90° relative to each other, thereby forming an imaginary trapezoidal area. Cross supports are arranged between the lateral wall components for the purpose of forming compartments for the CD cases, said cross supports preferably being arranged as rod-shaped elements that are positioned with slight clearance within the vicinity of the diagonal lines of the CD cases, which are inserted diagonally between the lateral wall components in the direction of the apex of the angle.

14 Claims, 4 Drawing Sheets

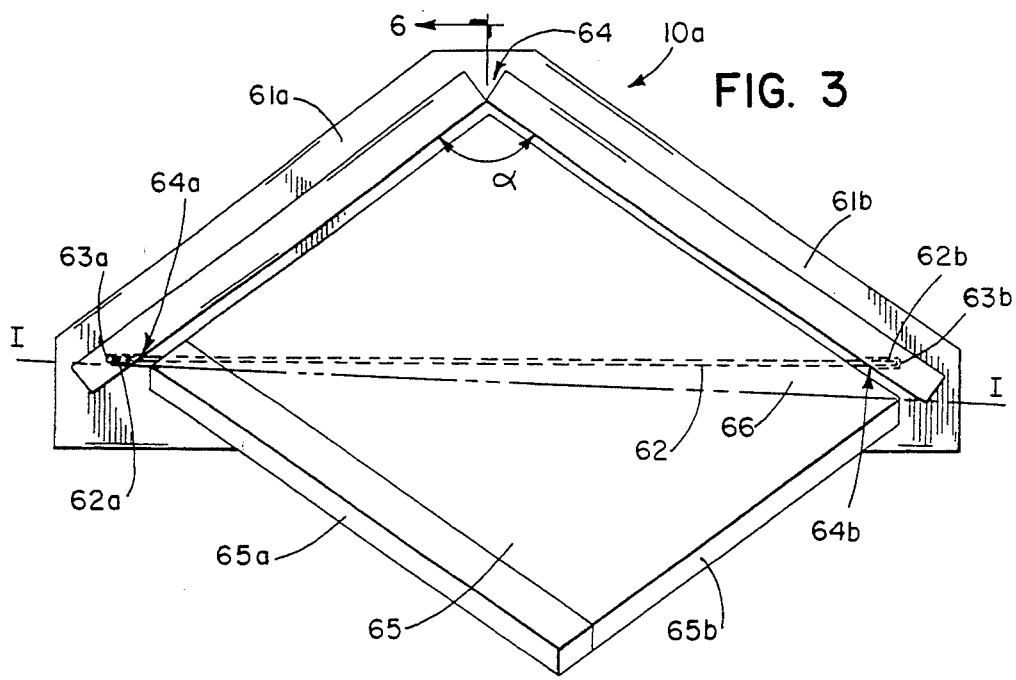
FIG. 3
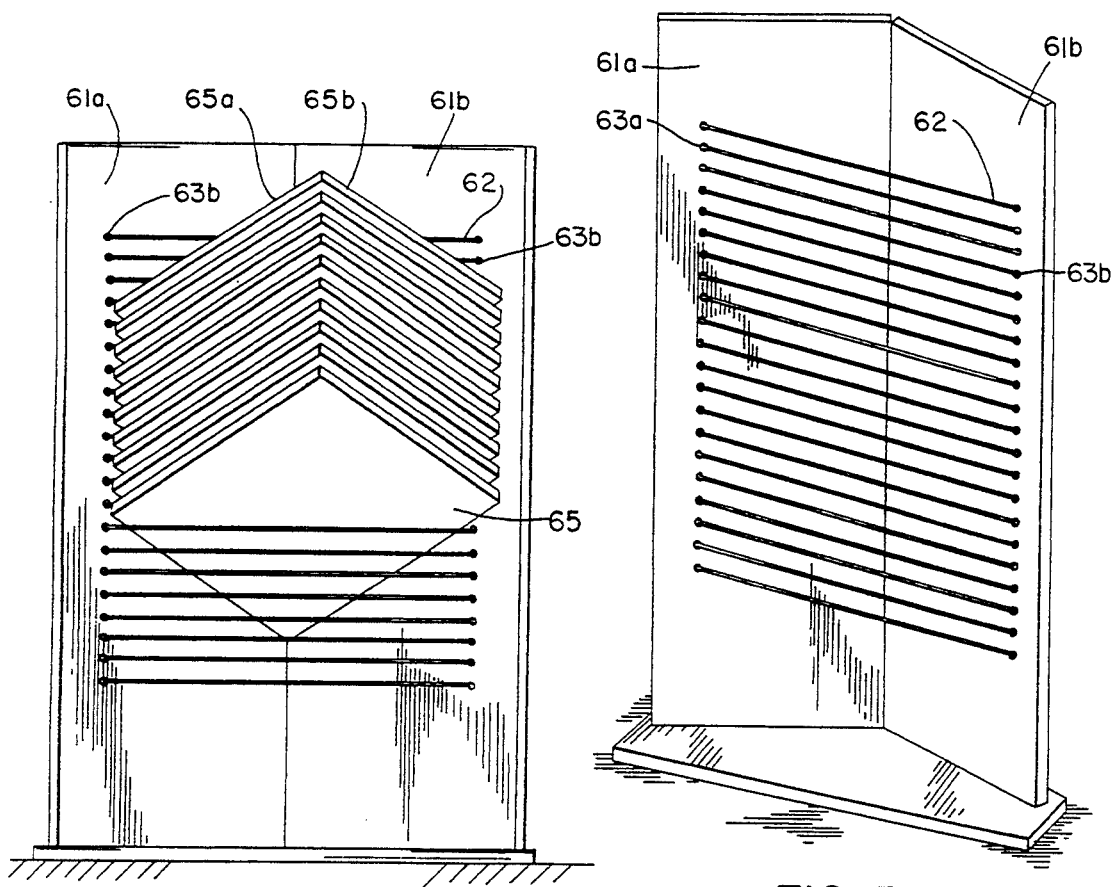
FIG. 4
FIG. 5

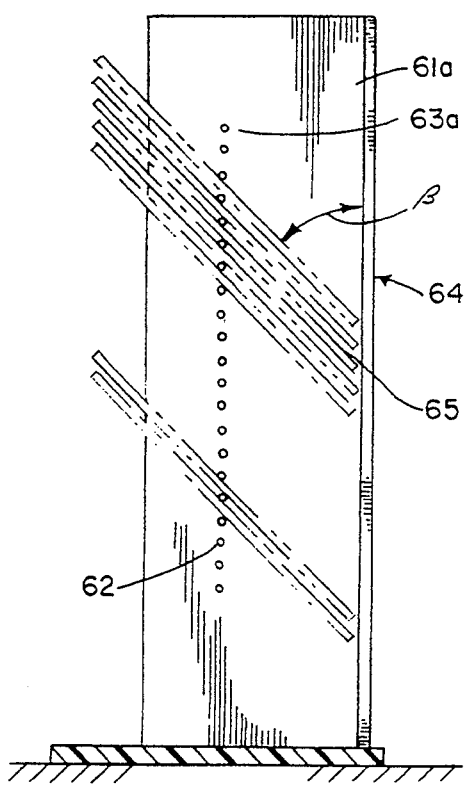
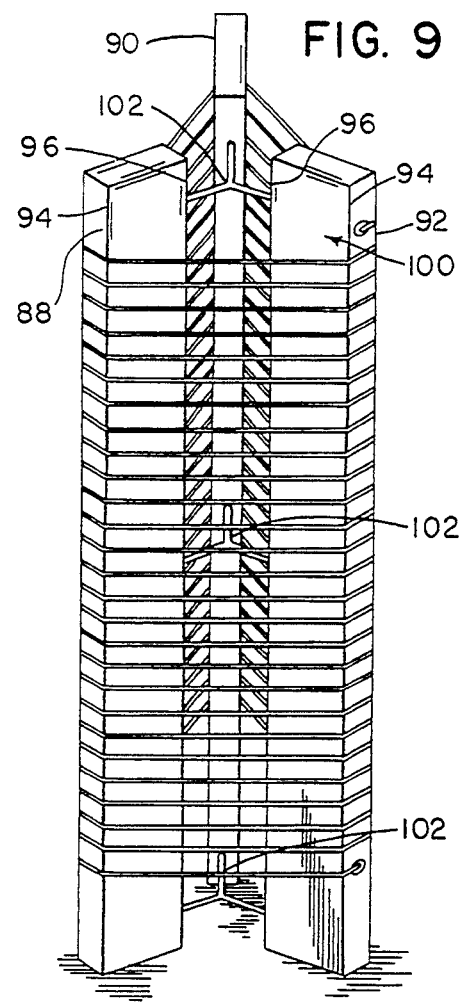
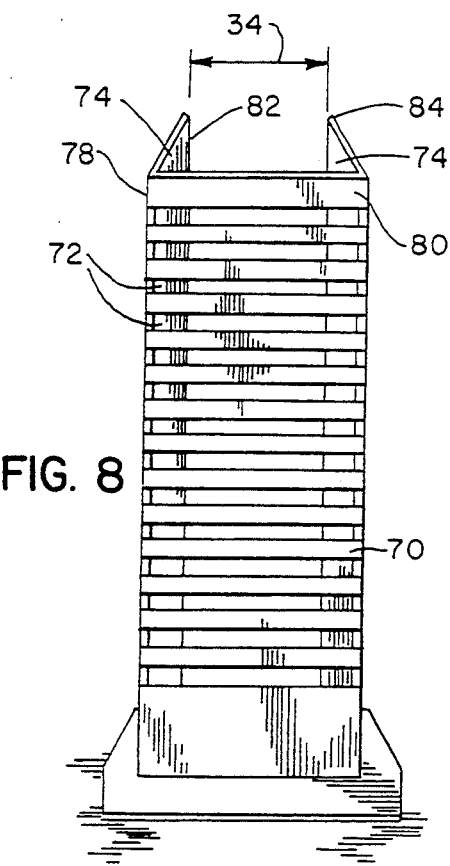
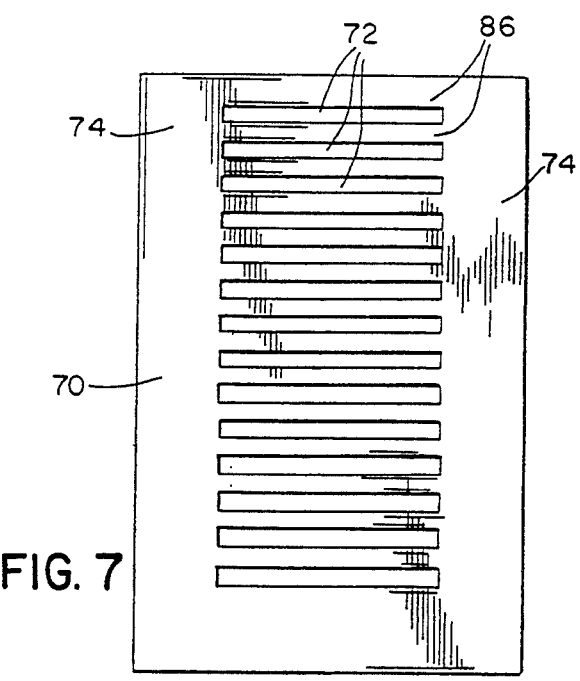

STORAGE RACK

FIELD OF THE INVENTION

The invention relates to a rack for the storage of flat, rectilinear objects, and in particular, cases for information media, such as compact disks, music cassettes, video cassettes and computer diskettes.

BACKGROUND OF THE INVENTION

Racks for storing objects, in particular compact disc cases (CD cases), are often constructed in the form of a tower, wherein these objects are typically stacked parallel and horizontally.

A tower of this type is known from German utility model G 91 03 216 and features two vertically extending lateral walls with a plurality of receptacle openings which are arranged at an acute angles relative to the horizontal. In most cases, the lateral walls consist of sheet metal, for which reason the receptacle openings are produced by means of a stamping process. This rather costly production process, however, causes very sharp edged receptacle openings, whereby the inserted objects, for example CD cases, are scratched. If the receptacle openings are not produced by a stamping process, then providing them in the lateral walls becomes even more costly.

During insertion in these known towers, the CD cases do not contact the receptacle until just before reaching the stable end position, whereby the insertion is made more difficult, in particular when the adjacent openings are already occupied. The insertion is, in particular, made more difficult when the receptacle openings also serve as lateral guides to improve the stable position, whereby the CD cases must be precisely inserted into the receptacle openings that have only slight clearance, without any horizontal support. In addition, the height of the receptacle openings typically only provide slight clearance because, due to an outlying center of gravity of the CD cases, the upper edges must be arranged as closely as possible to the upper side of the CD case in order to prevent it from tipping out.

When the CD cases are arranged in a compact manner, their removal also proves to be difficult because the clearances are usually too small between the individual CD cases and do not permit grasping the individual CD cases on their top and bottom oriented faces.

SUMMARY OF THE INVENTION

It is an object of the invention to provide a storage rack for rectilinear objects that reliably holds and readily permits retrieval of a multitude of objects, such as CD cases or other media storage cases.

It is another object of the invention to provide a storage rack for rectilinear objects that requires few parts and is otherwise easy and economical to manufacture.

It is a further object of the invention to provide a storage rack for rectilinear objects that easily accommodates for misaligned insertions of the object to be stored and can accommodate the misaligned insertion of several objects at once.

It is a yet another object of the invention to provide a storage rack for rectilinear objects that can provided in modules so that rack sections can be combined to increase the capacity of the storage system and to change the arrangement of the rack to adapt to different positioning requirements.

These and other objects of the invention are achieved by a storage rack for rectilinear objects, such as CD cases. The storage rack includes a support that preferably provides four substantially parallel linear contact surfaces, in which the contact surfaces define a trapezoidal area. At or near the longest side of the imaginary trapezoid, an insertion gap is formed by the support, and this gap is spanned by a cross support, such string or wire. The insertion gap is preferably narrower than the diagonals of the object to be inserted so that the sides of the support at the insertion gap can operate as stops for the object after insertion is completed.

The support can include four columns, each providing a contact surface for engaging the object. Two of the columns are spaced to provide the insertion gap and the two remaining columns are oriented to define side planes with the first two columns angled greater than 90° relative to each other. Each cross support is preferably a rod-shaped member, such as wire or string, and extends between the two columns on the wider insertion gap.

A rectilinear object is inserted in the direction of one of its diagonals above the cross support with a slight tilt downward Because the gap is narrower than the diagonals of the object, the insertion terminates when the columns are engaged by two sides of the object, but the object's center of gravity remains on the outer side of the cross support, thereby tending to rotate the inserted end of object upwardly about the cross support. This inserted end then engages the support columns around the smaller gap, whose width is smaller than the width of the corresponding portion of the object because of the trapezoidal geometry of the support, and is secured against further rotation.

The preferably rod-shaped cross support eliminates edges and thereby prevents scratching upon insertion. A plurality of cross support are preferably stacked with appropriate spacing. The rod-shaped cross supports are arranged superimposed and in parallel and in part form the insertion openings for the CD cases.

Another advantage of the invention is that the objects can be easily removed from the rack by pivoting them around a corner point located at a column near a fastening point of the cross support. The pivoting movement can be accomplished easily with only one finger by pushing the corner point of the object projecting from the rack sideways to grasp the object.

According to a further form of embodiment, the support columns can, in order to save material and for aesthetic reasons, consist of several individual components or can be interrupted by hole-like openings. However, at least the side of the respective lateral wall component turned toward the object to be stacked must define a plane with at least an origin at an imaginary apex of an angle of greater than 90°.

Due to its simple design, the storage rack can also easily be installed or retrofit into furniture, whereby only lateral wall components appropriately positioned with respect to each other, bore holes or slots for the fastening openings and a string or the like are required as the support elements.

If, according to another preferred embodiment of the invention, the rod-shaped support elements consist of a material with a surface hardness that is less than the surface hardness of the object to be stacked, such as, for example, of plastic or of a plastic coating, the risk of scratching the CD cases is reduced further. This effect is attenuated in particular by the fact that the number of supporting points is minimized as compared to conventional CD racks.

BRIEF DESCRIPTION OF THE DRAWINGS

Further features and advantages of the invention result from the following detailed description in conjunction with the associate drawings, in which:

FIG. 3 is a top sectional view of a second embodiment of a storage rack according to the invention;

FIG. 4 is a front view thereof;

FIG. 5 is a perspective lateral view thereof;

FIG. 6 is a sectional representation along the line I—I of FIG. 3;

FIG. 7 is a front perspective view of a third embodiment of the invention during fabrication;

FIG. 8 is a front perspective view of this third embodiment, when completed;

FIG. 9 is a front perspective view of a fourth embodiment of the invention;

DETAILED DESCRIPTION OF PREFERRED EMBODIMENTS

The invention relates to a storage rack for rectilinear objects. The following discussion of details of preferred embodiments refers to CD cases as the objects to be stored. However, the invention is not limited to storing CD cases, but can hold different rectilinear objects, including but not limited to, audio and video cassette cases and computer diskettes. Moreover, one skill in the art may find application of the invention to objects that are non-rectilinear, which would be within the intended scope of the invention. Objects having only one rectilinear corner are regarded as rectilinear and as a type of object to be stored by the structure of the invention.

Figures 1, 2:
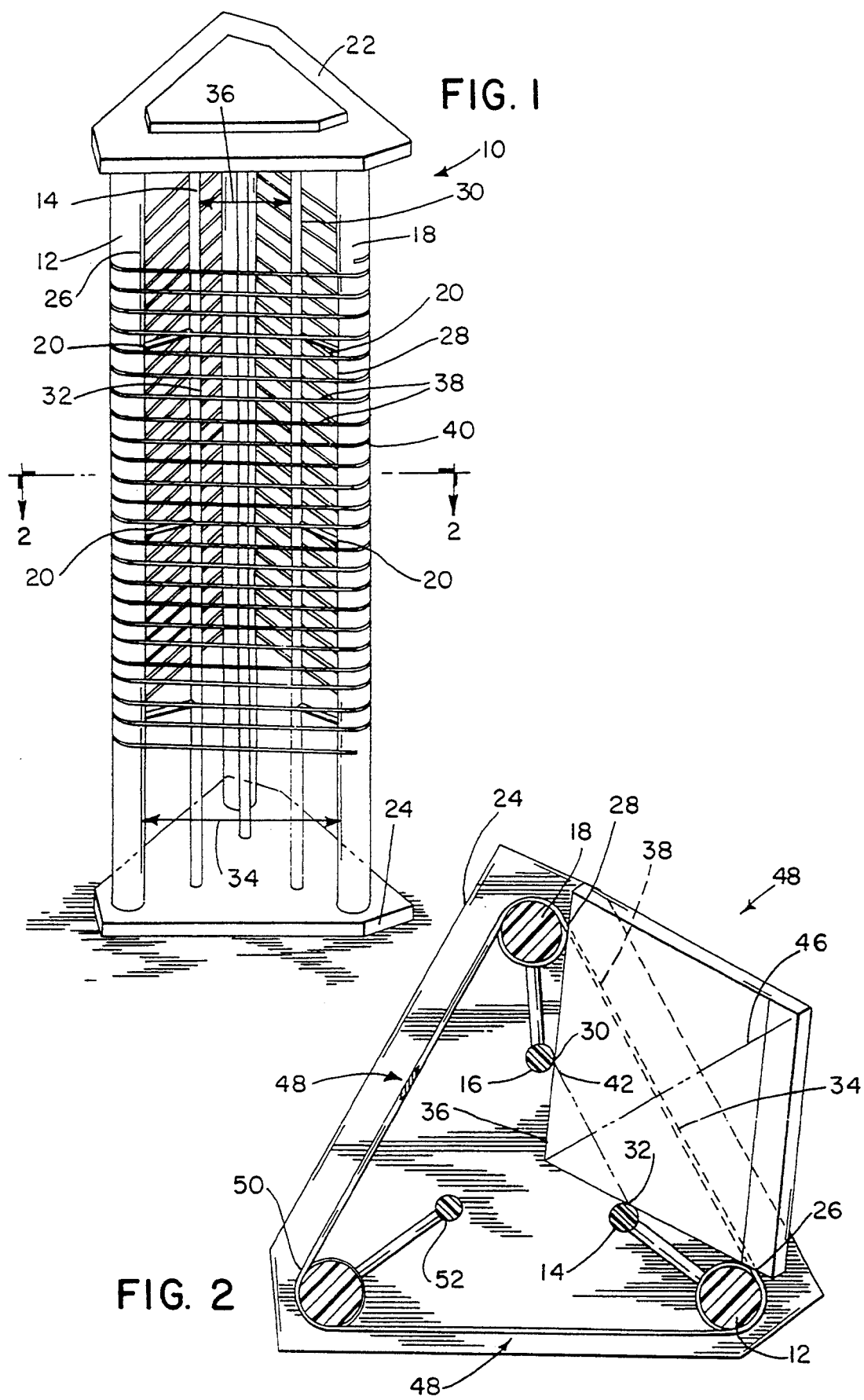
FIG. 1 is a perspective view of a first embodiment of a storage rack according to the invention.
FIG. 2 is sectional view from above of the rack with an inserted CD case.

In FIG. 1, a rack 10 for storing CD cases is shown. The rack 10 includes a support and a series of cross supports. The support can have a series of parallel columns 12, 14, 16, 18, which can be bolstered by struts 20 along their lengths. The support can have a top cap 22 and a base 24 for joining the columns 12, 14, 16, 18.

According to the invention, the support preferably provides four linear contact surfaces 26, 28, 30, 32. In the present embodiment, the linear contact surfaces 26, 28, 30, 32 extend along the lengths of the columns 12, 14, 16, 18 at the circumferential locations where CD cases contact the columns 12, 14, 16, 18 when inserted (See FIG. 2).

The location of the linear contact surfaces 26, 28, 30, 32 is important, but the arrangement and construction of the surrounding structure of the support is not as critical. The linear contact surfaces 26, 28, 30, 32 can be provided on separate columns 12, 14, 16, 18 as illustrated. Alternatively, the columns and struts can be replaced with solid posts, having flat surfaces or other surface geometries.

The support provides an insertion gap 34, here defined by the spacing of the columns 12, 18. A smaller holding gap 36 is formed by the angled arrangement of the columns 14, 16. According to the invention, the columns 12, 14, 16, 18 of the support are positioned so that the planes defined by the linear contact surfaces 26, 32 and the plane defined by the linear contact surfaces 28, 30 are angled greater than 90° relative to each other.

Several cross supports, such as sections 38 of a continuous string 40, span the insertion gap 34 and further define the receptacles for the CD cases.

Referring to FIG. 2, the linear contact surfaces 26, 28, 30, 32 (here illustrated as points in top view) form the corners of a substantially trapezoidal area 42 having two substantially parallel sides and two substantially non-parallel sides. The longer substantially parallel side corresponds to the insertion gap 34, and the shorter substantially parallel side corresponds to the holding gap 36.

The area 42 is referred to as substantially trapezoidal because the two parallel sides need only be substantially parallel and may deviate from exactly parallel alignment due to manufacturing and assembly variations. The substantially non-parallel sides are angled greater than 90° relative to each other and preferably in the range of 100°–110°. A 108° angle is preferred for CD case storage.

A CD case 44 is inserted in the direction of one of its diagonals 46 above the cross support with a slight tilt downward. Because the insertion gap 34 is narrower than the diagonals 46 of the CD case 44, the insertion ends when the linear contact surfaces 26, 28 are engaged by the sides of the CD case 44, but the case's center of gravity remains on the outer side of the string section 38, thereby tending to rotate the inserted end of CD case 44 upwardly about the string section 38. This inserted end then engages the linear contact surfaces 30, 32 defining the smaller holding gap 36, whose width is smaller than the width of the corresponding portion of the CD case 44 because of the trapezoidal geometry of the support, and is secured against further rotation.

Referring again to FIG. 1, the vertical spacing between the cross supports can vary. Preferably, the spacing between the string sections 38 is only slightly higher than the thickness of the object to be stored. For CD cases, the preferred width is one and one half the thickness of the CD case to be stored. This tight clearance increases the capacity for a given height of rack and facilitates the relatively rapid insertion of multiple cases simultaneously because two cases will not readily fit in one slot and the cases tend to be aligned with respective slots and insert to a holding position. The tight clearance also supports the cases if the rack is laid sideways in a horizontal configuration.

As can be seen in FIG. 2, the structure of the columns between the linear contact surfaces can be configured in any practical way, provided that the area occupied by the CD case is not obstructed. Also, the columns 12, 14, 16, 18 can form the sides of more than one rack segment. The columns 12, 14, 16, 18, 50, 52 can, for example, provide three rack segments in one tower.

The preferred structure of the invention is described with reference to linear contact surfaces 26, 28, 30, 32 because it is contemplated that multiple objects are stored on the rack. However, the invention has application to the storage of a single item in which the linear contact surfaces are so short as to be almost points.

In FIG. 3, a CD rack 10a is shown in which lateral wall components 61a and 61b that extend vertically form an angle alpha between them, which is preferably between 100° and 110°. If the two lateral wall components 61a and 61b do not make contact at the apex 64, the angle alpha must still be maintained at the theoretical apex.

The cross support is formed as a rod 62, which preferably but not necessarily is round in cross-section. The rod 62 extends horizontally between the outer ends of the two lateral wall components 61a, 61b to form a compartment, the ends 62a, 62b of the rod 62 are inserted in the bore holes 63a, 63b at the fastening points 64a, 64b of the lateral wall components 61a, 61b. The other rods for the formation of compartments are arranged in the same manner exactly vertical below rod 62. The bore holes 63a, 63b, which can be blind holes or continuous holes, are arranged in the same direction as rod 62. The attachment at the lateral wall components 61a, 61b is accomplished by means of expedient fastening devices which need not be explained in any detail here.

A CD case 65 is placed on rod 62. Since this CD case 65 is pivoted around a diagonal line distant from the apex angle alpha, around an angle beta in the range of 30°–50° (see FIG. 6), the faces 65a and 65b of the CD case 65 can also be seen in top view.

Rod 62 is approximately within the range of a diagonal 66 of the CD case 65 in the direction of the apex 64, whereby the CD case 65 is held in a shape-locking manner in its stable position. Since the respective distance between the fastening points 64a, 64b and the apex is smaller than the sides of CD case 65 contacting the lateral wall components 61a, 61b, the CD case 65 is securely prevented from sliding through the triangle formed between 64, 64a and 64b.

FIG. 4 shows the CD rack 10a with several inserted CD cases as seen in frontal view, wherein a zigzag like back and forth stretching of a string 62, such as a tennis racket string, is indicated by dotted lines. The bore holes 63a and 63b in this case are expediently arranged vertically, passing through the lateral wall components. While the end 62b of the string 62 is held in a shape-locking manner by the lateral wall part 61b by means of an end piece that is not shown, the other end 62a is introduced into the bore hole below by means of a piece of string extending vertically downward, from where it is again stretched to the lateral wall component 61b. After constructing other rod-shaped cross supports, the outermost end of the string 62 is finally fastened with appropriate fasteners at the lowest bore hole of a lateral wall part.

FIG. 5 shows the CD rack of FIG. 4 without CD cases, in a perspective side view. Finally, FIG. 6 shows the CD rack of FIG. 3 with CD cases in a cross sectional view according to line I—I of FIG. 3. The sectional plane is vertical to the path of rod 62, whereby it is also vertical to the base area of the CD cases 65. The right edge of the lateral wall component 1a that extends toward the rear from the sectional plane, and on which, according to the present exemplified embodiment all apices 64 of the apex angle alpha are located, and the CD cases form the pivot angle beta between themselves.

Referring to FIG. 7, a rack according to the invention can be constructed from a single unitary sheet of metal 70. Initially, slots 72 larger than the thickness of each of the objects to be stored can be punched or otherwise obtained in the sheet 70. The slots 72 only extend through a middle portion of the sheet 70. The unaffected sides 74 can then be folded back, as shown in FIG. 8, and angled relative to each other greater than 90°. The front edges 78, 80 form linear contact surfaces and define the insertion gap 34. The rear edges 82, 84 form linear contact surfaces and define the holding gap 36. Cross supports can be formed by the remaining plates 86 extending between the bent sides 74 which are unitary and integral therewith. As before discussed, the insertion gap 34 is less than the diagonal of the object to be inserted. The top edge of each plate 86 serves as a pivot axis for the inserted object.

Referring to FIG. 9, the rack can include three solid columns 88, 90, 92, each providing two of linear contact surfaces 94, 96 for a particular rack segment 100. The three columns 88, 90, 92 can be adjoined by star struts 102. The solid columns 88, 90, 92 provide greater resistance to bending under the string tension than the separate columns of the embodiment of FIG. 1. The solid columns 88, 90, 92 can be constructed of various materials, including wood and recycled plastic.

The cross supports can be provided by a continuous string 104 or wire wrapping around the columns 88, 90, 92 in a helical fashion. The columns 88, 90 can provide grooves that are generally horizontal with one column 92 having an angled groove to transition the string down to the next compartment level. Alternatively, each column 88, 90, 92 can have an angled groove with one third the decent of the single angled groove so that three columns 88, 90, 92 provide a unit descent for the string 104. The beginning and end of the string 104 can be fastened with conventional fasteners.

Figure 10:
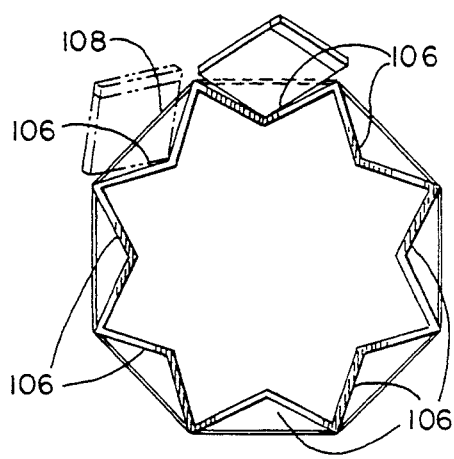
FIG. 10 is an alternative arrangement for racks according to the invention.

Referring to FIG. 10, a plurality of rack segments 106 can be provided to further increase the storage capacity of the rack. Any number of polygonal configurations can be constructed; here, eight segments are provided in an octagonal arrangement with a continuous string 108 for a cross support.

Figure 11:
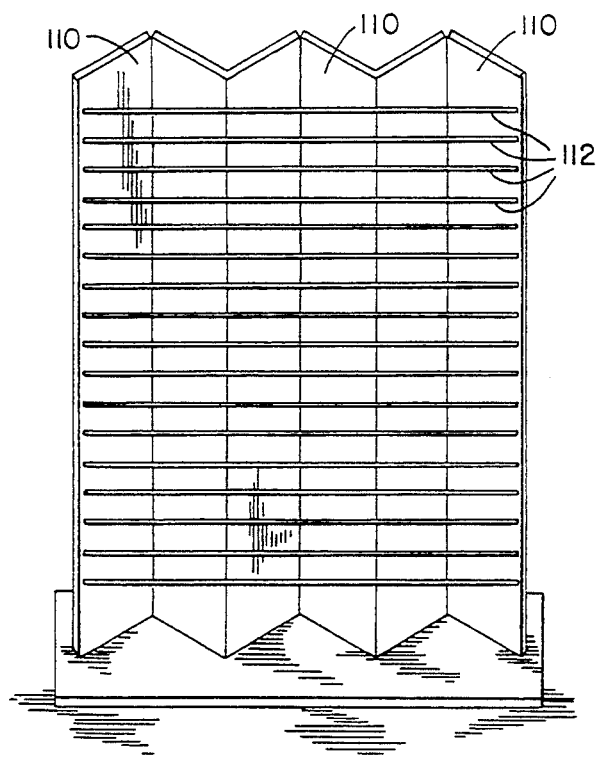
FIG. 11 is second alternative arrangement for racks according to the invention.

As shown in FIG. 11, rack segments 110 can be adjacent to one another to increase capacity in longitudinal environments, such as along walls, and share cross support structure in the form of a continuous string 112.

Figure 12:
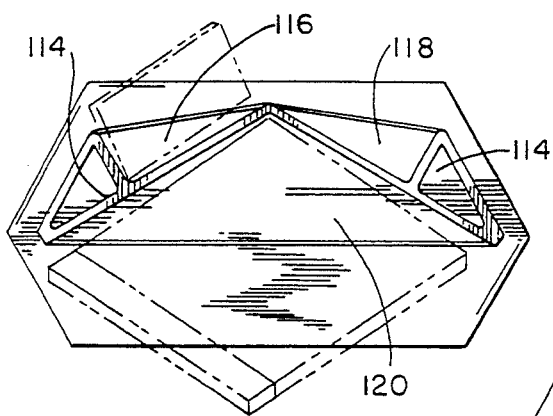
FIG. 12 is a multi-media embodiment of the invention capable of holding objects of different sizes.

In FIG. 12, a multi-media configuration of the rack is illustrated in which one common support body 114 provides rack segments 116, 118, 120 for accommodating different-size media cases, such as CD cases, audio cassette cases and video cassette cases.

Rack segments can also be adapted to stack vertically so that additional capacity can be gained as more cases are accumulated by the user.

Figure 13:
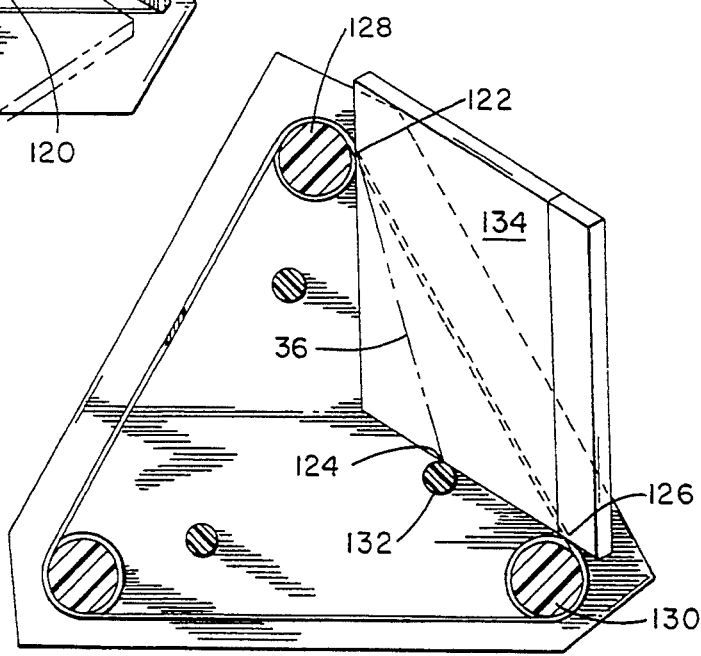
FIG. 13 is a top sectional view of a rack according to the invention having three contact surfaces.

Referring to FIG. 13, an alternative construction of the invention can be based on three linear contact surfaces or points. The support can include columns 128, 130, 132 that provide three linear contact surfaces 122, 124, 126 defining a scalene triangular area 134. The holding gap 36 is defined between the rearward linear contact surface 124 and one of the forward linear contact surfaces 122 and is narrower than the corresponding extension of the object that is attempting to pivot past the gap 36. The four line, trapezoidal arrangement is preferred, however, for its added stabilizing effects.

While several preferred embodiments and configurations of the invention have been set forth with a relatively high degree of particularity, the description is intended only to satisfy the disclosure requirements of the patent law. Modifications and variations within the spirit and scope of the invention may now be apparent to one skilled in the art. For example, because of the symmetry of the structure, it should be apparent to one skilled in the art that the rack can perform well in a horizontal configuration perpendicular to the orientations illustrated and discussed herein. Also, it should now be clear that the base of the support can be adapted to swivel so that different side of the rack can be viewed and accessed from position. Therefore, the invention should not be limited by such detailed features but rather should be determined from the following claims.

I claim:

1. A storage rack, comprising:
    a support having four substantially parallel linear contact surfaces, said support being arranged to provide an insertion gap between two of the linear contact surfaces and a holding gap opposite said insertion gap, said holding gap being between the other two linear contact surface, said four linear contact surfaces being spaced to form the four corners of a substantially trapezoidal area having two opposing, substantially parallel sides and two opposing, substantially non-parallel sides, said substantially non-parallel sides being angled at an angle of greater than 90 degrees relative to each other, one of said substantially parallel sides being longer than the other substantially parallel side; and
    a plurality of cross support extending across said insertion gap and connecting to said support proximate the corners of the longer substantially parallel side said plurality of cross supports being spaced from each other along a length of said insertion gap so as to define a plurality of areas that each can support an object, said holding gap being continuous and unobstructed at least along a length equal to said insertion gap length to permit pivoting of the object until holding engagement with said other two linear contact surfaces.

2. The rack of claim 1, wherein the width of the insertion gap is smaller than the diagonals of the object to be inserted.

3. The rack of claim 1, wherein the cross support is a longitudinal member.

4. The rack of claim 3, wherein the cross support is rod-shaped.

5. The rack of claim 4, wherein the cross support is one from a group including wire and string.

6. The rack of claim 3, wherein the cross support is integrally and unitarily formed with the support.

7. The rack of claim 1, wherein the portion of the cross support that contacts an object when inserted in the rack is shorter that the diagonal of the object.

8. The rack of claim 1, wherein the linear contact surfaces form edges of the support.

9. The rack of claim 1, wherein the support includes two columns.

10. The rack of claim 1, wherein the support includes four columns, each providing one of the linear contact surfaces.

11. The rack of claim 1, wherein the support is a unitary body.

12. The rack according to claim 1, wherein the angle is between 100° and 110°.

13. A rack for storing rectilinear objects, comprising:
    two lateral wall components that form an angle, serving at least to form compartments by means of which the objects are held laterally, said lateral wall components guiding and supporting objects at least in the area of the ends of one of their diagonals through opposite, lateral contact, sides of the lateral wall components facing the object being arranged at an angle (alpha) with respect to each other which is greater than 90°; and
    between the lateral wall components, essentially horizontally extending, cross supports for the formation of compartments for the object, said cross supports being in the form of rod shaped elements, having slight clearance within the area of the diagonal line of the objects when inserted diagonally between the lateral wall components in the direction of the apex of the angle alpha, wherein the space between said lateral wall components, in the direction of the apex of the angle alpha from the cross supports, is continuous and unobstructed to permit pivoting of an inserted object about one of said cross supports until holding engagement with said lateral wall components.

14. The rack according to claim 13, wherein the two lateral wall components, starting from the fastening point of the cross supports, extend only across part of the area between the fastening points and the apex of the angle formed between the two lateral wall components, thereby forming a holding gap opposite said cross supports.

* * * * *